United States Patent [19]
Otto et al.

[11] Patent Number: 5,937,988
[45] Date of Patent: Aug. 17, 1999

[54] THROTTLE DEVICE FOR HYDRAULIC ACTUATOR SYSTEMS AND FOR HYDRAULIC ACTUATOR SYSTEMS OF CLUTCHES OF MOTOR VEHICLES

[75] Inventors: Thomas Otto, Gochsheim; Volker Stampf; Wolfgang Grosspietsch, both of Schweinfurt, all of Germany

[73] Assignee: Fichtel & Sachs AG, Schweinfurt, Germany

[21] Appl. No.: 08/922,984

[22] Filed: Sep. 2, 1997

[30] Foreign Application Priority Data

Sep. 3, 1996 [DE] Germany .......................... 196 35 612

[51] Int. Cl.⁶ ............ F16D 11/00; F16K 17/38; F15B 7/00; F16F 9/52
[52] U.S. Cl. .............. 192/109 D; 192/109 F; 137/468; 60/591; 188/277
[58] Field of Search .............. 60/329, 590, 591, 60/592; 137/468, 513.3, 513.5, 254; 192/109 D, 109 F; 91/419; 236/93 R, 101 R; 188/276, 277

[56] References Cited

U.S. PATENT DOCUMENTS

| | | | |
|---|---|---|---|
| Re. 30,552 | 3/1981 | Ludwig | 236/101 E |
| 3,621,951 | 11/1971 | Schmid | 188/277 X |
| 3,856,206 | 12/1974 | Bell et al. | 137/468 X |
| 4,073,311 | 2/1978 | McGeachy | |
| 4,464,900 | 8/1984 | Bainbridge | 60/591 |
| 5,404,982 | 4/1995 | Gee | 198/109 D |
| 5,427,138 | 6/1995 | Ochiai et al. | |
| 5,544,485 | 8/1996 | Nakano et al. | 60/589 |

FOREIGN PATENT DOCUMENTS 2245522 10/1990 Japan .

*Primary Examiner*—Charles A Marmor
*Assistant Examiner*—Roger Pang
*Attorney, Agent, or Firm*—Nils H. Ljungman and Associates

[57] ABSTRACT

A throttle device for the directionally-dependent influencing of the flow velocity of the fluid in hydraulic actuator systems, in particular of friction clutches in motor vehicles, with a throttle located between a master cylinder and a slave cylinder in the hydraulic system. The throttle is formed by a base body with at least one through hole, which through hole can be at least partly closed by a rubber-elastomer disc. The rubber-elastomeric disc is located on the side of the base body facing the slave cylinder, which disc radially overlaps a through hole, which through hole can be at least partly closed.

19 Claims, 3 Drawing Sheets

THROTTLE DEVICE FOR HYDRAULIC ACTUATOR SYSTEMS AND FOR HYDRAULIC ACTUATOR SYSTEMS OF CLUTCHES OF MOTOR VEHICLES

BACKGROUND OF THE INVENTION

1. Field of the Invention

This invention relates to a device for the directionally-dependent influencing or control of the flow velocity of the fluid in hydraulic actuator systems, in particular of friction clutches in motor vehicles, with a throttle which is located between a master cylinder and a slave cylinder in the hydraulic system, which throttle is formed by a base body with at least one passage hole which can be at least partly closed.

2. Background Information

Hydraulic actuator devices for friction clutches are widely known. These devices consist of a master cylinder which can be pressurized by means of the clutch pedal and a slave cylinder which is connected to the master cylinder via a hydraulic line, which slave cylinder actuates the friction clutch by means of a release mechanism.

When the clutch is released, hydraulic fluid flows from the master cylinder into the slave cylinder, as a result of which the clutch opens. That is, when the clutch pedal is pushed down, hydraulic fluid flows from the master cylinder into the slave cylinder, as a result of which the clutch is disengaged. If the clutch pedal is released, the hydraulic fluid flows from the slave cylinder back into the master cylinder and the clutch is closed or engaged. If the clutch pedal is released when the vehicle is travelling extremely fast, for example if the driver's foot slips off the clutch pedal, the hydraulic fluid flows rapidly back out of the slave cylinder, as a result of which there is a hard clutch engagement, and extreme peak torques can occur which can be several times higher than the engine torque. Similarly, if the clutch pedal is released when the motor is running at a high speed, for example if the driver's foot slips off the clutch pedal, the hydraulic fluid flows rapidly back out of the slave cylinder, as a result of which there is a hard clutch engagement, and extreme peak torques can occur which can be several times higher than the engine torque. These peak torques cause a correspondingly high load on the drive train and result in a corresponding amount of wear.

To prevent the sudden closing or engaging of the clutch, German Patent No. 37 36 584 A1, for example, describes a device similar to the one described above in the hydraulic line between the master cylinder and the slave cylinder. For this purpose, there is a piston in a housing, which piston is mounted so that it can be displaced axially and has a central through hole and a plurality of axial peripheral grooves, and is held in its open position by means of a pressure spring or compression spring. When the clutch is released, the hydraulic fluid coming from the master cylinder flows unrestricted through the central through hole and the peripheral grooves toward the slave cylinder. If the clutch pedal is suddenly released, the pressure on the spring-loaded piston increases, and the piston moves axially toward the housing wall, as a result of which the peripheral grooves are closed and the hydraulic fluid can flow back only via the central through hole, as a result of which there is a corresponding delay in the closing or engaging of the clutch.

One disadvantage of this realization is that the viscosity of the hydraulic fluid changes during the operation of the motor vehicle. When the outside temperature is low, the viscosity of the hydraulic fluid is correspondingly high. The flow velocity of the fluid is therefore influenced fundamentally by the throttle in both directions. But there are situations in which the throttling action is too high during the return flow, and the clutch cannot follow the path specified by the operator in normal operation. The clutch pedal consequently remains "stuck" or "hangs." Although the driver has already deliberately released the clutch pedal, the clutch is not yet fully engaged. Because normally, the engine speed increases immediately after the driver releases the clutch pedal, there is a corresponding wear on the friction linings of the clutch. The delayed response of the clutch also reduces the ride comfort. The flow cross section can be made larger, but that can have the consequence that at high temperatures and thus correspondingly lower viscosities of the hydraulic fluid, the throttling action is no longer sufficient, and under extreme conditions, peak torques can be transmitted into the drive train.

Modern vehicles must be designed so that they can be operated worldwide under all climatic conditions. Therefore, it must be possible to operate the vehicle both in Arctic winters at the poles and in hot desert summers, without having to use special components.

OBJECT OF THE INVENTION

The object of the invention is to improve a device of the type described above so that it becomes possible to significantly compensate for changes in the viscosity of the hydraulic fluid.

SUMMARY OF THE INVENTION

The invention teaches that this object can be accomplished by a rubber-elastomer disc which is located on the side of the base body facing the slave cylinder, which disc radially overlaps at least one through hole which can be at least partly closed.

The elasticity characteristics of the rubber-elastomer disc are temperature-dependent. At low temperatures the disc is hard and not very flexible, while at higher temperatures it becomes correspondingly soft, whereby the elasticity values in themselves are a function of the material used, so that it becomes altogether possible for a technician skilled in the art to select the desired characteristic, from very hard to very soft. When the hydraulic fluid flows back from the slave cylinder into the master cylinder, the elastic disc more or less falls over the closable through hole and closes it. The degree of coverage is a function of the elasticity of the disc. If the disc is hard, the through hole cannot be completely closed. If the disc is soft, it flexes or is deformed around the through hole. At correspondingly low ambient temperatures, at the gaps between the base body and the disc, the high-viscosity hydraulic fluid can consequently flow through the through hole which is not completely closed, as a result of which a correspondingly high flow velocity can be realized. At higher temperatures, the disc becomes more elastic, and flexes to the through hole to a greater extent, as a result of which the through hole is closed further and the backflow or reflux is further reduced.

The object of the present invention is to maintain the restricted flow rate of hydraulic fluid from the slave cylinder to the master cylinder as close to constant as possible. Thus, the realization of a correspondingly high flow velocity refers to increasing the flow velocity in the setting of relatively cold temperatures when the hydraulic fluid viscosity is relatively high. However, the present invention maintains the flow rate of the cold hydraulic fluid through the throttle valve comparable to the flow rate of warm hydraulic fluid.

It is advantageous if there is also a permanently open through hole in the base body. The disc can then be realized with sufficient elasticity so that it closes the at least one additional through hole completely, and so that the backflow occurs only via the open through hole. A defined backflow characteristic can be achieved by a suitable choice of the open through hole.

To better influence the opening and closing action of the disc, the base body, on its side corresponding to the disc and in the vicinity of the closable through hole, has at least one shoulder which points in the axial direction. The size of the shoulder determines the degree of maximum closure.

In one preferred embodiment, there are a plurality of passage openings which can be at least partly closed, as a result of which the flow conditions become reproducible. In that case it is particularly advantageous if there are a corresponding number of radial webs between the through holes. These through holes can be distributed at regular intervals over a peripheral circle.

Preferably, there are three through holes and three webs.

In this embodiment, a soft disc can be applied in a corrugated shape over the through holes, and completely close them—if and to the extent that the disc is correspondingly soft. If the disc is hard at low temperatures, it will be deformed hardly at all, and therefore will be in flat contact with the webs, so that during the backflow, the maximum possible flow cross section is achieved. The corrugated shape of the disc is a result of the flexibility of the disc and the pressure from the hydraulic fluid. That is, the flexible disc is deformed into a corrugated shape as a result of being bent over the webs by the pressure of the hydraulic fluid.

The base body can be made of plastic, which makes it a component which can be manufactured particularly economically.

It is particularly advantageous if the base body is realized in the shape of a cup with a central mandrel pointing in the direction of the slave cylinder, which mandrel has the permanently open through hole, the disc is guided axially on the mandrel and there is a small peripheral gap between the cup-shaped protuberance and the disc. As a result of this configuration, a secure orientation and guidance of the disc becomes possible. The flow behavior of the hydraulic fluid from the slave cylinder to the master cylinder (backflow) can thereby be influenced by the selection of the peripheral gap between the disc and the base body.

The throttle can be integrated both into the compression or pressure area of the master cylinder and into the slave cylinder. It thereby becomes possible to realize the overall system in the form of a compact assembly. That is, the throttle device can be integrated into either the master cylinder or the slave cylinder, so that a more compact clutch actuation assembly results.

The above discussed embodiments of the present invention will be described further hereinbelow with reference to the accompanying figures. When the word "invention" is used in this specification, the word "invention" includes "inventions", that is, the plural of "invention". By stating "invention", the Applicants do not in any way admit that the present application does not include more than one patentably and non-obviously distinct invention, and maintains that this application may include more than one patentably and non-obviously distinct invention. The Applicants hereby assert that the disclosure of this application may include more than one invention, and, in the event that there is more than one invention, that these inventions may be patentable and non-obvious one with respect to the other.

BRIEF DESCRIPTION OF THE DRAWINGS

One embodiment of the invention is explained in greater detail below with reference to the accompanying drawing, in which.

DESCRIPTION OF THE PREFERRED EMBODIMENT

Figure 3:
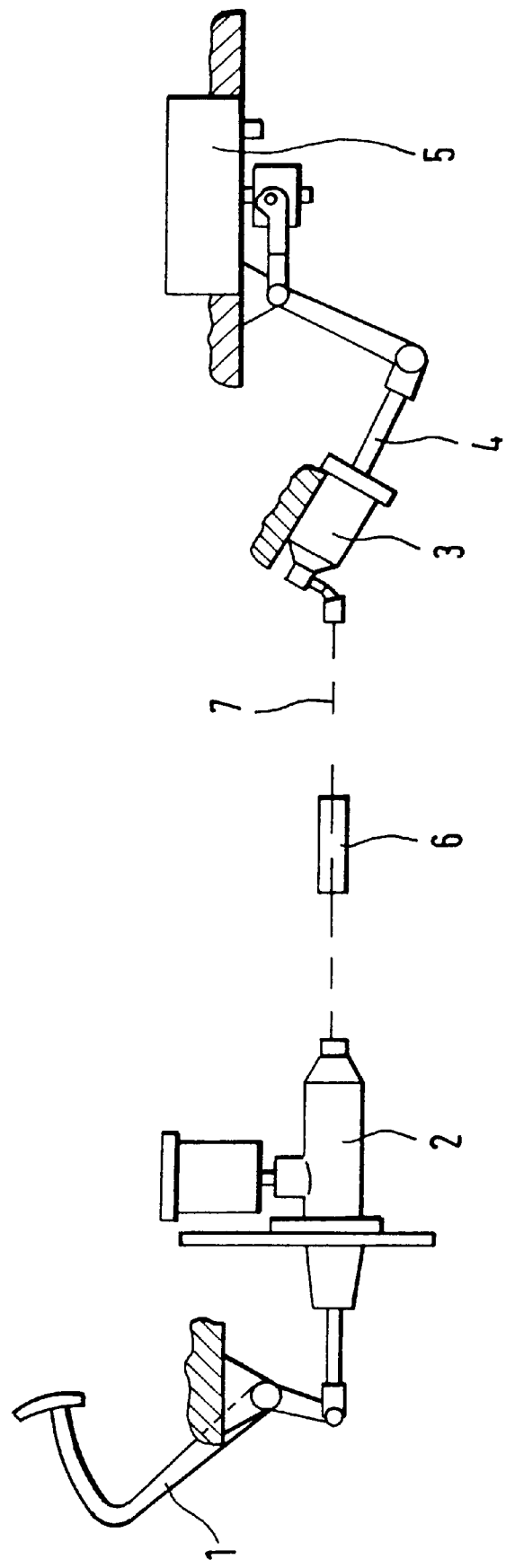
FIG. 3 shows the schematic layout of the hydraulic actuator system in a motor vehicle.

As shown in FIG. 3, the hydraulic actuator system for the friction clutch of a motor vehicle includes a master cylinder 2 which can be activated by means of the clutch pedal 1, which master cylinder 2 is connected by means of a hydraulic line 7 to a slave cylinder 3, which slave cylinder 3 acts on the friction clutch 5 by means of a release device 4. The device 6 to influence the flow speed of the hydraulic fluid is provided in the hydraulic line 7 illustrated in FIG. 3. The device 6 need not necessarily be integrated into the hydraulic line. The device 6 could also be located in the compression area of the master cylinder 2 or in the slave cylinder 3.

Figure 4:
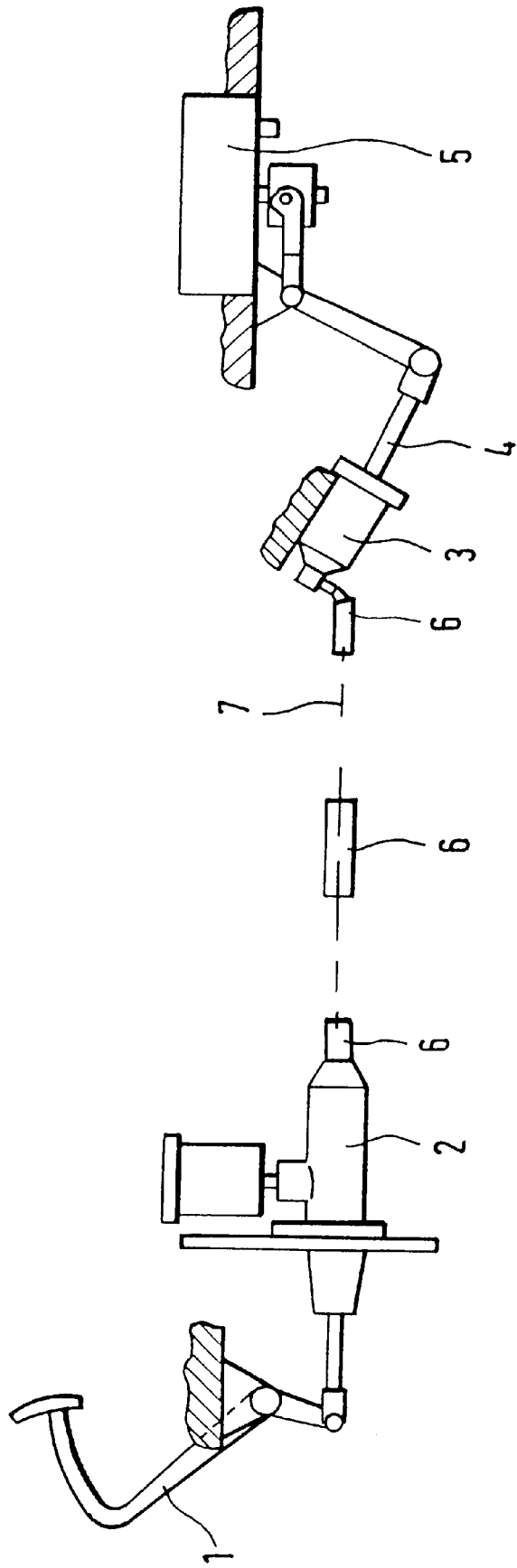
FIG. 4 is similar to FIG. 3 but shows additional features.

FIG. 4 shows two additional alternative locations for the location of the throttle valve 6 in a clutch actuator system. In one alternative arrangement, the throttle 6 is integrated into the compression area of the master cylinder 2. In the second alternative arrangement, the throttle 6 is integrated into the slave cylinder 3. Although FIG. 4 shows the throttle 6 in three possible locations, the three locations are alternatives and generally would not be used together in a single clutch actuator system.

Figure 1:
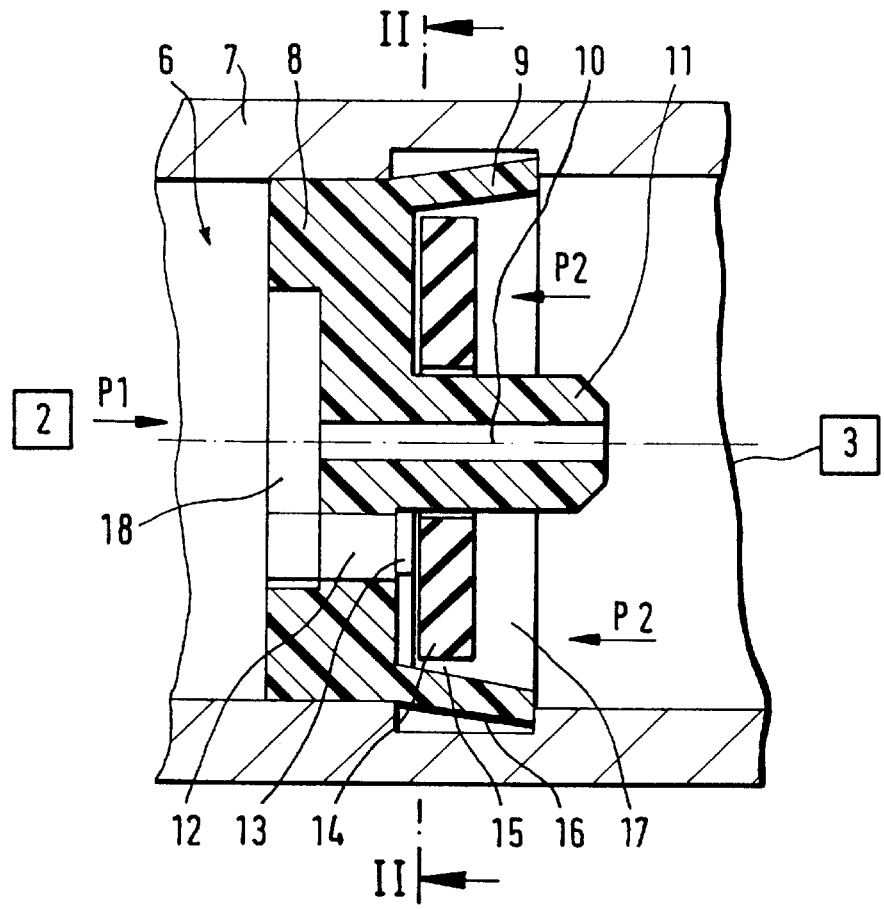
FIG. 1 shows the throttle in axial section, in a simplified representation.
Figure 2:
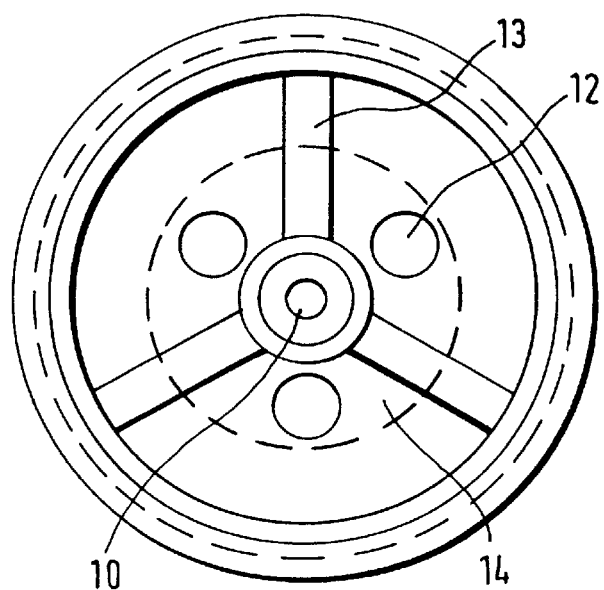
FIG. 2 is an overhead view of the throttle along line II—II in FIG. 1.

As shown in FIG. 1, the throttle device, throttle valve, or throttle element 6 includes the plastic base body 8 and the disc 14, which disc 14 is guided on a central projection or mandrel 11, which mandrel 11 points in the axial direction and is realized on the base body 8. The base body 8, on its side facing the master cylinder 2, is provided with a rather large central recess 18, coaxial to which there is a permanently open through hole 10 in the mandrel 11. Radially offset from the through hole 10, three through holes 12 continue from the recess 18, which three through holes or passage openings 12 emerge into the ring-shaped space 17 formed by the mandrel 11 and the protuberance 9.

The through holes 12 are typically distributed at intervals of 120 degrees around a circle. Between the through holes 12 run three radial webs 13, on which the disc 14 lies, so that the through holes 12 are open as long as there is no load on the disc 14. The base body 8 is axially fixed in position in a peripheral groove 16 in the hydraulic line 7 by means of the cup-shaped protuberance 9, which cup shaped protuberance 9 opens outward in the shape of a truncated cone.

If the master cylinder 2 is pressurized, hydraulic fluid flows in the direction indicated by the arrow P1 via the recess 18 through the through holes 10 and 12 toward the slave cylinder 3. As a result of the hydraulic fluid flowing through the through holes 12, the disc 14 is lifted off the radial webs 13. During the backflow from the slave cylinder 3, the hydraulic fluid flows in the direction indicated by the arrows P2. A portion of the hydraulic fluid flows unhindered back through the through hole 10 to the master cylinder 2. As a result of the pressure which is exerted on the disc 14, the disc 14 is pressed against the webs 13, and is deformed to a greater or lesser degree, depending on its elasticity. If the disc 14 is hard (low temperature), it cannot close the through holes 12, or it can only close them to a slight extent. The correspondingly high-viscosity hydraulic fluid also flows through the through holes 12 back to the master cylinder 2 by means of the ring-shaped gap 15 (peripheral gap). If, on the other hand, the disc 14 is soft (high temperatures), it flexes around the radial webs 13 and assumes a corrugated contour, by means of which the disc 14 completely closes the through holes 12 or closes the through holes 12 to a large extent. If the disc 14 completely closes the through holes 12, the hydraulic fluid can then only flow back to the master cylinder 2 via the through hole 10. If the disc 14 closes the through holes 12 to a large extent but not completely, the hydraulic fluid can then flow back to the master cylinder 2 via the through hole 10 and to some extent via the through holes 12.

Corresponding tests must be performed to select a material for the disc which also changes its elasticity in a manner which corresponds to the change in the viscosity of the fluid, to compensate for the temperature-dependence of the hydraulic fluid. If it is necessary to basically permit a backflow of hydraulic fluid through the through holes 12 to maintain the functional capability of the clutch, the material of which the disc 14 is made must be selected so that it prevents the possibility of a complete closing of the through holes 12. Consequently, it should not be overly plastic or ductile. The essential teaching of the invention is that there is at least one passage hole which cannot be completely closed. If, as in the embodiment described above, there is a permanently open through hole 10, the defined backflow can be maintained by means of this permanently open through hole 10. In that case, it is possible to realize the disc 14 so that it is plastic or ductile. If it is determined that the through hole 10 itself is not capable of maintaining the defined backflow, because the space available for installation is sufficient only for a limited diameter, a backflow must then also be maintained via the through holes 12.

The disc 14 can be retained on mandrel 11 in many ways. The mandrel 11 can be configured to have a slowly increasing taper in the direction of the slave cylinder 3, so that once the elastomeric disc 14 is pushed onto the mandrel 11, the disc 14 will not slip off. Alternatively, a retaining ring can be placed around the mandrel 11 after the disc 14 is placed on the mandrel 11. Further, the mandrel can be configured to have a retaining portion, which retaining portion can have an inclined surface in the direction of the slave cylinder 3 and a vertical surface in the direction of the through holes 12. The inclined surface permits the elastomeric disc 14 to slide over the retaining portion, and the vertical surface prevents the disc 14 from slipping off the mandrel 11.

One feature of the invention resides broadly in the device for the directionally-dependent influencing or control of the flow velocity of the fluid in hydraulic actuator systems, in particular of friction clutches in motor vehicles, with a throttle, choke point, or restrictor 6 located between a master cylinder 2 and a slave cylinder 3 in the hydraulic system, which throttle is formed by a base body 8 with at least one through hole or passage boring which can be at least partly closed, characterized by a rubber-elastomer disc or washer 14 which is located on the side of the base body 8 facing the slave cylinder 3, which disc 14 radially overlaps a passage hole 12 which can be at least partly closed.

Another feature of the invention resides broadly in the device characterized by the fact that there is also a permanently open through hole 10 in the base body 8.

Yet another feature of the invention resides broadly in the device characterized by the fact that the base body 8, on its side corresponding to the disc 14, in the vicinity of the at least one closable through hole 12, has at least one shoulder 13 which points in the axial direction.

Still another feature of the invention resides broadly in the device characterized by the fact that there are a plurality of at least partly closable through holes 12.

A further feature of the invention resides broadly in the device characterized by the fact that the through holes 12 are distributed at regular intervals over a peripheral circle.

Another feature of the invention resides broadly in the device characterized by the fact that there are a corresponding number of radial webs 13 between the through holes 12.

Yet another feature of the invention resides broadly in the device characterized by the fact that there are three through holes 12 and three radial webs 13.

Still another feature of the invention resides broadly in the device characterized by the fact that the base body 8 is made of plastic.

A further feature of the invention resides broadly in the device characterized by the fact that the base body 8 is realized in a cup shape with a central mandrel 11 pointing in the direction of the slave cylinder 3, which mandrel 11 has the permanently open through hole, the disc 14 is guided axially on the mandrel 11 and there is a small peripheral gap 15 between the cup-shaped protuberance 9 and the disc 14.

Another feature of the invention resides broadly in the device characterized by the fact that the throttle is integrated into the compression area of the master cylinder 2.

Yet another feature of the invention resides broadly in the device characterized by the fact that the throttle is integrated into the slave cylinder 3.

The present invention could be used in conjunction with the clutch assembly and actuator disclosed in U.S. patent application Ser. No. 08/618,174, filed Mar. 20, 1996, and entitled "A Clutch Assembly for a motor vehicle having an Actuator Cylinder for the engagement and release of the Friction Clutch Assembly," which is hereby incorporated by reference as if set forth in its entirety.

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application No. 196 35 612.1, filed on Sep. 3, 1996, having inventors Thomas Otto, Volker Stampe, and Wolfgang Grosspietsch, and DE-OS 196 35 612.1 and DE-PS 196 35 612.1, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clause are intended to cover the structures described herein as performing the recited function and not only structural equivalents but also equivalent structures.

The invention as described hereinabove in the context of the preferred embodiments is not to be taken as limited to all of the provided details thereof, since modifications and variations thereof may be made without departing from the spirit and scope of the invention.

What is claimed is:

1. A device for the directionally-dependent control of flow velocity of fluid in hydraulic actuator systems of friction clutches in motor vehicles, said device for being disposed to permit hydraulic fluid flowing between a master cylinder and a slave cylinder to flow through said device, said device comprising:

a base body;

said base body comprising at least one through hole configured to permit the passage of hydraulic fluid therethrough;

said at least one through hole comprising a first end for being disposed in hydraulic connection toward a slave cylinder;

said at least one through hole comprising a second end for being disposed in hydraulic connection toward a master cylinder;

an arrangement for restricting flow of hydraulic fluid through at least one of said at least one through hole upon hydraulic fluid flowing from a slave cylinder to a master cylinder;

said arrangement for restricting flow comprising a member configured to at least partially cover said at least one of said at least one through hole upon hydraulic fluid flowing from a slave cylinder to a master cylinder;

said member being disposed adjacent said first end of said at least one of said at least one through hole;

said member comprising an elastic material; and said elastic material being configured to increase in flexibility at higher temperatures and decrease in flexibility at lower temperatures to permit said member to at least partially cover said at least one of said at least one through hole to thus compensate for a change in viscosity of hydraulic fluid upon an increase or decrease in temperature.

2. The device according to claim 1, wherein said base body comprises a permanently open through hole to permit hydraulic fluid to flow therethrough.

3. The device according to claim 1, wherein:

said base body has a central axis;

said base body comprises an arrangement to support said member a substantial distance from said first end of said at least one of said at least one through hole to permit hydraulic fluid to flow through said at least one of said at least one through hole toward a master cylinder; and said member supporting arrangement comprises at least one member projecting in a direction substantially parallel to the central axis and in a direction of fluid flow toward a slave cylinder.

4. The device according to claim 1, wherein said at least one of said at least one through hole is a plurality of at least partly closable through holes.

5. The device according to claim 4, wherein said plurality of at least partly closable through holes are disposed to be distributed at regular intervals around said base body over a peripheral circle.

6. The device according to claim 4, wherein:

said member is disc shaped;

said base body has a central axis;

said base body comprises an arrangement to support said member a substantial distance from said first end of said at least one of said at least one through hole to permit hydraulic fluid to flow through said at least one of said at least one through hole toward a master cylinder;

said member supporting arrangement comprises at least one member projecting in a direction substantially parallel to the central axis and in a direction of fluid flow toward a slave cylinder;

each of said projecting members is a radially extending web; and each of said radially extending webs is disposed between two adjacent ones of said plurality of at least partly closable holes.

7. The device according to claim 6, wherein:

said plurality of projecting members comprises three webs; and said plurality of at least partly closable holes comprises three at least partly closable holes.

8. The device according to claim 1, wherein said base body is constructed of plastic.

9. The device according to claim 2, wherein:

said base body has a central axis;

said base body comprises a central mandrel extending along the central axis in a direction of hydraulic fluid flow toward a slave cylinder;

said base body comprises a cup shaped protuberance disposed around said central mandrel and disposed a substantial distance from said central mandrel;

said member is disc shaped;

said permanently open through hole is disposed in said central mandrel;

said disc shaped member is disposed on said mandrel to be guided by said mandrel in the axial direction; and said disc shaped member and said cup shaped protuberance are configured to form a gap therebetween to permit hydraulic fluid to flow therethrough.

10. The device according to claim 1, wherein said device is integrated into the compression area of a master cylinder.

11. The device according to claim 1, wherein said device is integrated into a slave cylinder.

12. A device for the directionally-dependent control of flow velocity of fluid in hydraulic actuator systems, said device for being disposed to permit hydraulic fluid flowing between a master cylinder and a slave cylinder to flow through said device, said device comprising:

a base body;

said base body comprising a first end and a second end;

said base body being configured to permit hydraulic fluid to flow in a first direction from said first end to said second end;

said base body being configured to permit hydraulic fluid to flow in a second direction from said second end to said first end;

said base body comprising at least one through hole configured to permit the passage of hydraulic fluid therethrough;

said through hole comprising a first end disposed adjacent said first end of said base body;

said through hole comprising a second end disposed adjacent said second end of said base body;

an arrangement for restricting flow of hydraulic fluid through said at least one through hole upon hydraulic fluid flowing in the first direction;

said arrangement for restricting flow comprising a member configured to at least partially cover at least one of said at least one through hole upon hydraulic fluid flowing in the first direction;

said member being disposed adjacent said first end of said through hole;

said member comprising an elastic material; and said elastic material being configured to increase in flexibility at higher temperatures and decrease in flexibility at lower temperatures to permit said member to at least partially cover said at least one of said at least one through hole.

13. The device according to claim 12, wherein said base body comprises a permanently open through hole to permit hydraulic fluid to flow therethrough.

14. The device according to claim 12, wherein:

said base body comprises an arrangement to support said member a substantial distance from said first end of said at least one of said at least one through hole to permit hydraulic fluid to flow through said at least one of said at least one through hole in the first direction; and said member supporting arrangement comprises at least one member projecting in the second direction.

15. The device according to claim 13, wherein:

said at least one of said at least one through hole is a plurality of at least partly closable through holes;

said plurality of at least partly closable through holes are disposed to be distributed at regular intervals around said base body over a peripheral circle;

said member configured to at least partially cover is disc shaped;

said base body has a central axis;

said base body comprises an arrangement to support said member a substantial distance from said first end of said at least one of said at least one through hole to permit hydraulic fluid to flow through said at least one of said at least one through hole in the first direction;

said member supporting arrangement comprises a plurality of members projecting in the second direction;

each of said projecting members is a radially extending web;

each of said radially extending webs is disposed between two adjacent ones of said plurality of at least partly closable holes;

said base body comprises a central mandrel extending along the central axis in the second direction;

said base body comprises a cup shaped protuberance disposed around said central mandrel and disposed a substantial distance from said central mandrel;

said permanently open through hole is disposed in said central mandrel;

said disc shaped member is disposed on said mandrel to be guided by said mandrel in the axial direction; and said disc shaped member and said cup shaped protuberance are configured to form a gap therebetween to permit hydraulic fluid to flow therethrough.

16. A device for the directionally-dependent control of flow velocity of fluid in hydraulic actuator systems, said device comprising:

a base body;

said base body comprising at least one through hole configured to permit the passage of hydraulic fluid therethrough;

said at least one through hole comprising a first end and a second end;

an arrangement for resisting flow of hydraulic fluid through at least one of said at least one through hole upon hydraulic fluid flowing in a first direction from said first end to said second end to a greater degree than upon hydraulic fluid flowing in a second direction from said second end to said first end;

said hydraulic fluid flow resisting arrangement comprising an arrangement for at least partially closing said at least one through hole upon hydraulic fluid flowing in the first direction;

said arrangement for at least partially closing said at least one through hole comprising an arrangement for closing a larger portion of said at least one through hole at higher temperatures than at lower temperatures;

said arrangement for closing a larger portion of said at least one through hole at higher temperatures than at lower temperatures comprising a member configured to at least partially cover said at least one of said at least one through hole upon hydraulic fluid flowing in the first direction;

said member comprising an elastic material; and said elastic material being configured to increase in flexibility at higher temperatures and decrease in flexibility at lower temperatures.

17. The device according to claim 16, wherein said base body comprises a permanently open through hole to permit hydraulic fluid to flow therethrough.

18. The device according to claim 17, wherein:

said base body comprises an arrangement to support said member a substantial distance from said first end of said at least one of said at least one through hole to permit hydraulic fluid to flow through said at least one of said at least one through hole in the first direction; and said member supporting arrangement comprises at least one member projecting in the second direction direction.

19. The device according to claim 18, wherein;

said at least one of said at least one through hole is a plurality of at least partly closable through holes;

said plurality of at least partly closable through holes are disposed to be distributed at regular intervals around said base body over a peripheral circle;

said member configured to at least partially cover is disc shaped;

said base body has a central axis;

said member supporting arrangement comprises a plurality of members projecting in the second direction;

each of said projecting members is a radially extending web;

each of said radially extending webs is disposed between two adjacent ones of said plurality of at least partly closable holes;

said base body comprises a central mandrel extending along the central axis in a direction of hydraulic fluid flow from said second end to said first end;

said base body comprises a cup shaped protuberance disposed around said central mandrel and disposed a substantial distance from said central mandrel;

said permanently open through hole is disposed in said central mandrel;

said disc shaped member is disposed on said mandrel to be guided by said mandrel in the axial direction; and said disc shaped member and said cup shaped protuberance are configured to form a gap therebetween to permit hydraulic fluid to flow therethrough.

* * * * *